Dec. 20, 1938.      F. SNOW      2,140,562
METER TESTER
Filed Sept. 8, 1936
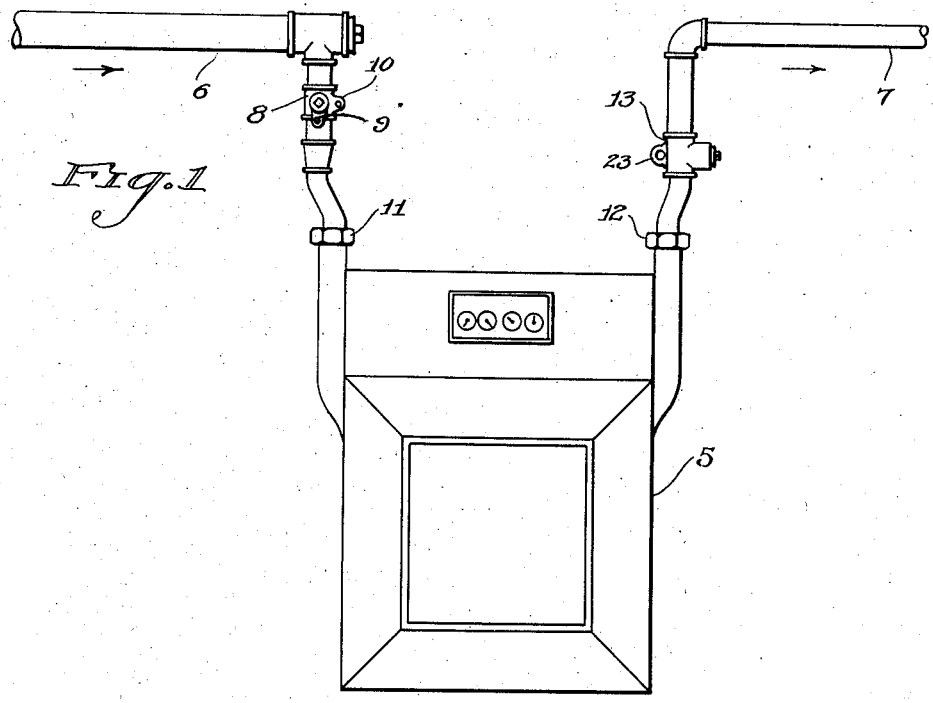
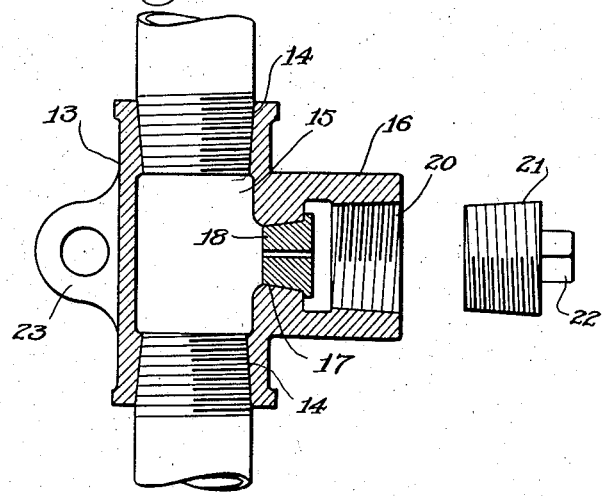
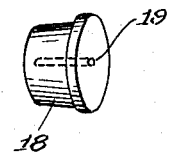
Frank Snow
INVENTOR
BY *Victor J. Evans & Co.*
ATTORNEYS Patented Dec. 20, 1938

2,140,562

UNITED STATES PATENT OFFICE 2,140,562

METER TESTER

Frank Snow, Brooklyn, N. Y.

Application September 8, 1936, Serial No. 99,839

2 Claims. (Cl. 73—51)

The present invention relates to a meter testing device.

The primary object of the invention is to provide a means for determining whether or not a meter will properly register a small rate or flow of gas without interfering with the normal flow of gas therethrough.

The invention will be fully and comprehensively understood from a consideration of the following detailed description when read in connection with the accompanying drawing which forms part of the application.

In the drawing,

Figure 1 is an elevational view illustrating the device attached in the usual gas feed line, Figure 2 is a sectional view of the tester and illustrating the plug removed therefrom, and Figure 3 is a perspective view of the feeding plug through which the gas flows during the testing.

At the present time the method of testing a gas meter to determine whether or not the meter will register a small rate of gas flow requires four operations. First, the supply of gas from the main feed line must be shut off, after which the outlet pipe of the meter is disconnected. A test cap is then affixed to the outlet side of the meter and the gas turned on to permit the flow thereof through the meter and into the test cap. After the test is completed, the same operations have to be repeated in order to reconnect the meter.

The present invention provides for the permanent attachment in the outlet pipe of a device which requires only two operations to perform the test. There is also eliminated the necessity of temporarily shutting off the flow of gas through the meter.

Referring to the drawing for a more detailed description thereof, the usual gas meter is indicated by the numeral 5 and the supply of gas is fed over the inlet or service pipe 6. After registering in the meter, the gas is supplied to the dwelling through the outlet pipe 7. The supply of gas from the service pipe is controlled by the valve 8 having a lever 9 for disconnecting the service of the gas. When the service is disconnected the lever 9 is suitably locked and sealed through the connection 10. The usual meter connections 11 and 12 are provided for connecting the service pipe and outlet pipe respectively, to the meter.

The testing device indicated generally by the numeral 13 is positioned in the outlet side of the meter and preferably above the connection 12 and said device is T-shaped in cross section and is threaded at each end as at 14 for connection to the outlet pipe 7. The central portion of the tester is provided with an opening 15 to permit the normal flow of gas from the meter to the service connections.

The portion 16 of the tester 13 has an opening 17 communicating with the opening 15 and positioned in said opening 17 is a tapered plug 18 provided with a restricted bore 19 also communicating with the opening 15. The plug 18 when positioned in the opening 17, forms a permanent part of the tester.

The outer end of the portion 16 is threaded as indicated at 20, for receiving a plug 21 which plug is to be removed when testing the flow of gas. The plug 21 includes an extension 22 for engagement by a wrench or similar tool to aid in the removal thereof.

When desiring to make a test to determine whether the meter 5 will register a small rate of gas flow, all outlets connected to line 7 are closed thereby preventing flow of gas thru same and the plug 21 is removed so that the gas flowing through the connection 12 will be caused to flow through the restricted bore 19 of the plug 18 whereby the person making the test will readily be able to determine that the meter will register the flow of gas. After making the test the plug 21 is replaced and the meter continues to operate in its customary manner. It will be seen therefore that the meter has been tested without the necessity of disconnecting the supply of gas or utilizing a separate means which must be connected to and disconnected from the meter, and that the herein described tester forms a permanent part of the outflow pipe.

An ear 23 also forms a part of the tester 13 and is provided for supporting the lock normally used for sealing the inlet valve 8. When the lock is not in use it may be retained in the ear 23 thereby preventing loss thereof.

It is to be understood that this invention is capable of extended application and is not confined to the exact showing of the drawing nor to the precise construction described, and therefore, such changes and modifications may be made therein as do not affect the spirit of the invention nor exceed the scope thereof as expressed in the appended claims.

I claim:

1. Meter testing apparatus comprising inlet and outlet pipes for connection with a meter, means substantially permanently attached and made integral with said outlet pipe for testing the flow of gas through said meter, said means including a T-shaped connection having an opening therethrough, the extension of said T-shaped connection having an opening communicating with said first-mentioned opening, a plug positioned in said last-mentioned opening and having a restricted bore therethrough and means for normally closing said last-mentioned opening.

2. Meter testing apparatus comprising inlet and outlet pipes for connection with a meter, means substantially permanently attached and made integral with said outlet pipe for testing the flow of gas through said meter, said means including a T-shaped connection having an opening therethrough, the extension of said T-shaped connection having an opening communicating with said first-mentioned opening, a plug positioned in said last-mentioned opening and having a restricted bore therethrough and means for normally closing said last-mentioned opening, said last named means including a plug removably supported in said extension.

FRANK SNOW.